United States Patent Office 3,644,621
Patented Feb. 22, 1972

3,644,621
O,O-DIMETHYL PHOSPHOROTHIOATE ESTERS OF METHYL PYRAZINOLS AS INSECTICIDES
Richard Joseph Magee, Princeton, and James Byron Lovell, Pennington, N.J., assignors to American Cyanamid Company, Stamford, Conn.
No Drawing. Original application Sept. 16, 1968, Ser. No. 762,379, now Patent No. 3,505,328, dated Apr. 7, 1970. Divided and this application Feb. 6, 1970, Ser. No. 9,394
Int. Cl. A01n 9/36
U.S. Cl. 424—200                 5 Claims

ABSTRACT OF THE DISCLOSURE

Insecticidal compounds are provided having the formula:

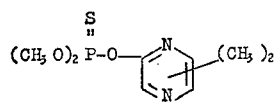

This is a divisional application of application Ser. No. 762,379, filed Sept. 16, 1968, and now issued as U.S. Pat. No. 3,505,328.

SUMMARY OF THE INVENTION

This invention relates to O,O-dimethyl phosphorothioate esters of methyl pyrazinols which have the formula:

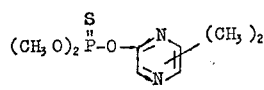

This invention also pertains to the use of the compounds as insecticides and acaricides.

BACKGROUND OF THE INVENTION

The compounds of this invention are embraced within the generic disclosure of compounds given in U.S. Pats. 2,918,468; 2,938,831; 3,091,614; and 3,340,262. They are, however, not specifically disclosed in any of these patents.

Applicants have now discovered that the compounds of this invention possess unusual properties not generally shared by the large number of compounds embraced within the generic formula of the above patents. More particularly, applicant has discovered that, when compared to the compounds disclosed in the above patents, the inventive compounds (1) possess substantially lower mammalian toxicity, (2) are significantly more potent toward certain difficult to control insects which ravage cotton and other economic crops and (3) exhibit substantially greater activity, including residual activity, against the alfalfa weevil.

The unusual properties discussed above will be exemplified hereinbelow by comparative data with structurally similar compounds and other promising compounds of the above patents, said compounds hereinafter called "prior art compounds."

DESCRIPTION OF THE PREFERRED EMBODIMENTS

The following are illustrative of the compounds of this invention:

O,O-dimethyl-O-(3,5-dimethyl-2-pyrazinyl) phosphorothioate
O,O-dimethyl-O-(5,6-dimethyl-2-pyrazinyl) phosphorothioate
O,O-dimethyl-O-(3,6-dimethyl-2-pyrazinyl) phosphorothioate The compounds are readily prepared by techniques shown in U.S. Pats. 2,918,468; 2,938,831; 3,091,614; and 3,340,262, said patents herein incorporated by reference. The compounds may also be prepared by reacting dimethyl phosphorochloridothioate with the appropriate methyl substituted hydroxypyrazine in the presence of potassium tertiary butoxide (about one mole per mole of hydroxypyrazine) and dimethylsulfoxide solvent at temperatures of 20 to 60° C.

The compounds of this invention are useful for controlling a variety of insects and acarides such as those shown in the examples provided hereinbelow. They may be applied to the foliage of plants as dusts or liquid sprays to protect them from insects which feed thereon; they may also be incorporated in or applied to the soil in order to protect germinating and growing plants from soil-borne pests which attack the root systems and stems of said plants; or they may be applied to the breeding sites of pests to control both the larvae and adult stages of breeding pest populations. In the latter situations the compounds may be applied in conventional formulations such as dusts, dust concentrates, granular materials, wettable powders, emulsifiable concentrates and the like. They may be employed as an emulsion in water or other non-solvents to which suitable surfactants, wetting agents or emulsifying agents have been added. They may be applied on solid carriers, such as talcs and clays, as for example kaolin clay or fuller's earth, or on such carriers as chalk, wood flour, silica, charcoal, activated carbon or other inert powders. As a wettable powder, the compound of this invention may be applied to easily wettable carrier materials, such as attaclay, with or without the aid of surfactants, or on less readily wettable carriers in combination with suitable surfactants.

Advantageously, the compounds of the invention may also be applied by the most modern techniques of low volume or ultra-low volume application wherein the compound is applied essentially as a technical material or in combination with a minor amount of hydrocarbon solvent such as Panasol AN–5, Socal 44–L or Esso HAN (all commercially available).

The compounds of this invention may also be applied in combination with other essentially technical materials, such as malathion, which in addition to having insecticidal properties also serve as a formulation vehicle.

The following examples are provided to further illustrate the unusual properties exhibited by the compounds of this invention.

COMPARATIVE EXAMPLE 1.—MAMMALIAN TOXICITY AND GENERAL INSECTICIDAL ACTIVITY (A) Bean aphid—*Aphis fabae* Scopoli Compounds are tested as 0.1% solutions or suspensions in 65% acetone–34% water. Two-inch fiber pots, each containing a nasturtium plant two inches high and infested with about 150 aphids two days earlier, are placed on a turntable (4 r.p.m.) and sprayed for two revolutions with a #154 DeVilbiss Atomizer at 20 p.s.i. air pressure. The spray tip is held about six inches from the plants and the spray is directed so as to give complete coverage of the aphids and the plants. The sprayed plants are laid on their sides on white enamel trays which have had the edges coated with #50 SAE oil as a barrier. Mortality estimates are made after holding for two days at 70° F., and 50% R.H.

(B) Southern armyworm—*Prodenia eridania* (Cramer)

The solutions from the aphid test are also used for this one. Sieva lima bean primary leaves are dipped for three seconds in the test solution and set in a hood on a screen to dry. When dry, each leaf is placed in a 4-inch petri dish which has a moist filter paper in the bottom and ten third-instar armyworm larvae about ⅜" long. The dishes are covered and held at 80° F., and 60% R.H. After 2 days, mortality counts and estimates of the amount of feeding are made.

(C) Two-spotted spider mite—*Tetranychus urticas* (Koch)

Sieva lima bean plants with primary leaves three to four inches long are infested with about 100 adult mites per leaf four hours before use in this test. The mite and egg infested plants are dipped for three seconds in the same solutions used in the above tests, and the plants set in the hood to dry. They are held for two days at 80° F., 60% r.h., and the adult mite mortality estimated on one leaf under a stereoscopic microscope. The other leaf is left on the plant an additional five days and then examined at 10× power to estimate the kill of eggs and of newly-hatched nymphs, giving a measure of ovicidal and residual action, respectively.

(D) Confused flour beetle—*Tribolium confusum* Jacquelin duVal

Compounds are formulated as 1% dusts by mixing 0.1 gram of the compound with 9.9 grams of Pyrax ABB talc, wetting with 5 ml. of acetone and grinding with a mortar and pestle until dry. 125 mg. of this 1% dust is then blown into the top of a dust settling tower with a short blast of air at 20 p.s.i. The dust is allowed to settle on four-inch petri dishes for two minutes, giving a deposit of approximately 87 mg./sq. foot (.094 mg./sq. cm.) of the 1% dust. The dishes are removed and 25 adult confused flour beetles are added immediately. The dishes are held for three days at 80° F. and 60% R.H., following which mortality counts are made.

(E) Large milkweed bug—*Oncopeltus fasciatus* Dallas

The 1% dusts described above are used in this test. 25 mg. of the 1% dust is sprinkled evenly over the glass bottom of a seven-inch diameter cage, using a screen-bottom plastic cup about ⅝" in diameter as an applicator, giving a deposit of approximately 94 mg./sq. ft. (.108 mg./sq. cm.) of the 1% dust. Water is supplied in a two-ounce bottle with a cotton wick, twenty adult bugs are added and a screen cover placed on the top. Mortality counts are made after holding for three days at 80° F. and 60% R.H.

(F) German cockroach—*Blattella germanica* (Linnaeus)

The procedure is the same as for the large milkweed bug test, except that in this test only adult males are used.

(G) Systemic tests

The compound to be tested is formulated as an emulsion containing 0.1 gram of test material, 0.2 gram of Alrodyne 315 emulsifier, 10 ml. of acetone and 90 ml. of water. This is diluted ten-fold with water to give a 100 p.p.m. emulsion for the initial test. A sieva lima bean plant with only the primary leaves unfolded is cut off just above soil level and inserted into a two ounce bottle of 100 p.p.m. emulsion and held in place by a bit of cotton wrapped around the stem. The bottle is then placed in a ventilated box with the leaves extending outside the box, such that any possible fumes from the compound will be drawn out the end of the box rather than rising to affect the test leaves. About 50 adult two-spotted spider mites are placed on each leaf. After holding three days at 80° F. and 60% R.H., mortality estimates are made and one leaf from each plant is placed on a moist filter paper in the bottom of a petri dish. Ten third-instar southern armyworm larvae are added to each dish and mortality counts made after holding another three days at 80° F. and 60% R.H.

(H) Common malaria mosquito—*Anopheles quadrimaculatus* Say (1) *Larvicide test.*—Groups of 25 larvae of the common malaria mosquito are transferred with a medicine dropper to a 50 ml. beaker containing 25 ml. of water. The test compound is formulated as an emulsion containing 0.1 gram of test material, 0.2 gram of Alrodyne 315 emulsifier, 10 ml. of acetone and 90 ml. of water. This 1000 p.p.m. emulsion is diluted ten-fold with 65% acetone-35% water to give 100 p.p.m. One milliliter of the 100 p.p.m. emulsion is pipetted into 225 ml. of water in a 400 ml. beaker and stirred vigorously. The larvae in 25 ml. of water are added, giving a concentration of 0.4 p.p.m. Mortality counts are made after 24 hours at 80° F.

(2) *Adulticide test.*—Test compounds are prepared as 10 p.p.m. solutions in acetone. Glass microscope slides are dipped in the test solutions and allowed to dry in a horizontal position. When dry, they are individually placed in four-ounce wide mouth bottles and ten 4- to 5-day old mosquitoes of mixed sexes are added to each bottle. A piece of cotton gauze serves as a lid, and a wad of cotton soaked in 10% sugar solution serves as food. Mortality counts are made after 24 hours of continuous exposure to the residue on the glass slide; temperature is 80° F. and R.H. is 60%.

(I) Housefly—*Musca domestica* Linnaeus

Groups of 25 adult female houseflies are lightly anesthetized with $CO_2$, placed in wide-mouth pint mason jars, and covered with a screen cap. The test compound is formulated as an emulsion containing 0.1 gram of test material, 0.2 gram of Alrodyne 315 emulsifier, 10 ml. of acetone and 90 ml. of water. Two milliliters of this emulsion are diluted to 40 ml. with 10% sugar solution in a 10-gram glass vial, giving a concentration of 50 p.p.m. The mouth of the vial is covered with a single layer of cheesecloth, inverted and placed on the screen cap, so that the flies can feed on the solution through the screen. Mortality counts are made after two days at 80° F.

(J) Southern corn rootworm—*Diabrotica undecimpunctata howardi* Barber

The compound is formulated as a dust and incorporated into the soil at the equivalent of 10 pounds per 6-inch acre. The soil is sub-sampled into one-ounce wide mouth bottles, and ten 6 to 8-day old rootworm larvae added to each bottle, which is then capped. Mortality counts are made after six days at 80° F., 60% R.H.

(K) False wireworm—*Eleodes suturalis* Say

The test is the same as with the rootworm except that 10 day old wireworm larvae are used.

$LD_{50}$ values are measured in accordance with standardized and well known procedures which do not bear repeating herein.

Results are shown in Table I.

TABLE I.—MAMMALIAN TOXICITY (EXPRESSED AS LD₅₀) AND GENERAL INSECTICIDAL AND ACARACIDAL ACTIVITY (EXPRESSED AS PERCENT MORTALITY)

| | | | | | | | | | Systemics | | Mosquito | | | | | | LD₅₀ | |
|---|---|---|---|---|---|---|---|---|---|---|---|---|---|---|---|---|---|---|
| | No. | Compound | S.A.W. .1% | Aphids, .1% | Mites, .1% | TC, 1% | MB, 1% | GC, 1% | Mites, 100 p.p.m. | S.A.W., 100 p.p.m. | Larvae, .4 p.p.m. | Adults, 10 p.p.m. | Fly, 50 p.p.m. | R.W., 10 lb., acre | W.W., 10 lb., acre | Rat | Mice |
| This invention | 1 | (CH₃O)₂P(S)—O—pyridine(CH₃,CH₃) | 100 | 100 | 100 | 100 | 100 | 100 | 100 | 100 | 100 | 100 | 100 | 100 | 100 | 123 | 89 |
| | 2 | (C₂H₅O)₂P(S)—O—pyridine(CH₃,CH₃) | 100 | 100 | 100 | 100 | 80 | 0 | 100 | 100 | 100 | 100 | 100 | 100 | 100 | | 19 |
| | 3 | (CH₃O)₂P(S)—O—pyridine(CH₃,CH₃) | 100 | 100 | 100 | 100 | 100 | 95 | 100 | 100 | 100 | 100 | 100 | 100 | 100 | | 26 |
| Prior art compounds | 4 | (C₂H₅O)₂P(S)—O—pyridine(CH₃,CH₃) | 100 | 100 | 100 | 100 | 90 | 100 | 100 | 100 | 100 | 0 | 100 | 100 | 100 | | 16.9 |
| | 5 | (C₂H₅O)₂P(S)—O—pyridine(CH₃,CH₃) | 100 | 100 | 100 | 100 | 100 | 100 | 100 | 100 | 100 | 100 | 100 | 100 | 100 | 10–12 | 1 |

NOTE.—S.A.W.=Southern Armyworm; TC=Tribolium Confusum (confused flour beetle); MB=Milkweed Bug; GC=German Cockroach; RW=Rootworm; WW=Wireworm.

The data in Table I above clearly indicate the high insecticidal potency of the inventive compounds against a variety of insects and acarides as well as their substantially lower toxicity toward mammals. For example, referring to Table I, compound 1 and 2 are alike in all respects except that compound 1 has two methoxy groups attached to the phosphorus while compound 2 has two ethoxy groups in the same position. Inventive compound 1, however, is only about ⅕ as toxic to mice as is prior art compound 2. Similar effects are noted when compound 1 is compared with closely related prior art compounds 3 (about ⅓ as toxic to mice), and 4 (about ⅕ as toxic to mice). Compound 5 represents a preferred potent species of the prior art compounds and is presented to further amplify the wide variation in mammalian toxicity noted in the inventive compounds when compared to the prior art compounds. Compound 5 has been marketed by the American Cyanamid Co. as a nematocide under the trademark Zinophos® and has enjoyed widespread commercial acceptance. It is noted that inventive compound 1 is only ⅟₈₉ as toxic to mice and about ⅟₁₀ as toxic to rats as is Zinophos®. However, compound 1 possesses substantially similar insecticidal and acaricidal activity to Zinophos®.

The compounds of this invention can be classified as moderately toxic in contrast to the highly toxic classification given to the prior art compounds. This observed reduction in mammalian toxicity permits the compounds to be handled with less hazzard than their more toxic counterparts. This lower toxicity is a particular advantage in any operation in which the compound is likely to come in contact with a human such as, for example, in formulating the compound and in distribution and application of the compounds. Low toxicity is a further advantage when airplane spraying is contemplated since it often becomes necessary to dilute more toxic compounds prior to spraying in order to minimize the potential hazzard which could occur if the spray should be carried into contact with humans or animals, or if animals should feed on sprayed vegetation.

ACTIVITY AGAINST INSECTS OF THE "COTTON COMPLEX"

The compounds of this invention have been found to possess an unusually high activity against certain pests which ravage cotton and other economic crops. Such pests will be referred to hereafter as the "cotton complex" of insects, said "cotton complex" comprising insects selected from the group consisting of lygus, tobacco budworm, bollworm (also commonly referred to as corn earworm and tomato fruitworm), and boll weevil. The boll weevil is essentially a cotton pest; however, lygus, tobacco budworm, and bollworm not only ravage cotton, but also such important economic crops as beans, soybeans, green beans, snapbeans, corn, alfalfa, tomatoes, tobacco, safflower, and clover. Thus, despite classification within the "cotton complex," it must be understood that lygus, tobacco budworm, and bollworm are a threat to a variety of crops in addition to cotton, and that the unusually high potency shown by the compounds of this invention is directed toward the insects of the "cotton complex" per se and is substantially independent of the vegetative environment in which the insect happens to be found.

The "cotton complex" of pests is known to be extremely difficult to destroy by treatment with chemical agents. This difficulty is believed due to the ability of these particular insects to develop a resistance to the various chemicals used against them.

The unusual activity of the compounds of this invention against the difficult to control "cotton complex" of insects is exemplified by the data presented in comparative Examples 2 and 3 hereinbelow.

COMPARATIVE EXAMPLE 2.—ACTIVITY AGAINST TOBACCO BUDWORM

*Heliothis virescens* (tobacco budworm) is placed in a one-ounce plastic medicine cup containing about 10 grams of artificial diet used for rearing tobacco budworms. Each budworm is treated topically on the dorsal surface with 0.96 μl. of acetone containing 40, 20 or 10 μg. of compound. If the mortality at the lowest rate is 50% or more, each succeeding concentration is reduced ½ until the activity is nil. The data are plotted on dosage-response logarithmic paper from which an $LD_{50}$ is determined.

The treatments are made with a ¼ cc. tuberculin syringe fitted with a No. 26 gauge hypodermic needle and driven by the spindle of a micrometer head. For convenience the vernier is turned 10 divisions which delivers 0.96 μl.

After treatment, the cups are capped with plastic lids and held at 80° F. for 48-hour mortality counts. At least ten budworms are used for each concentration.

Results are shown in Table II.

TABLE II.—ACTIVITY AGAINST TOBACCO BUDWORM

| | Number | Compound | $LD_{50}$ (μg./larva) |
|---|---|---|---|
| This invention | 1 | 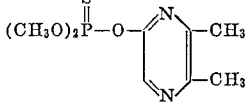 | .35 |
| Prior art compounds | 2 | 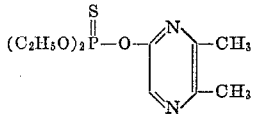 | 6.5 |
| | 3 | 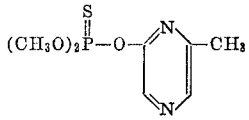 | .75 |
| | 4 | 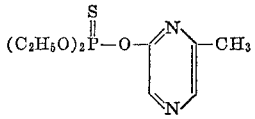 | 5.5 |
| | 5 | 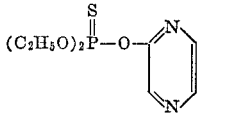 | 6.5 |

As indicated by the data of Table II above, the inventive compounds appear particularly active against the tobacco budworm. In analyzing the data of Table II, it must be pointed out that since the objective is to destroy the tobacco budworm, low $LD_{50}$ values are desirable since the lower the $LD_{50}$ value observed, the greater the toxicity of the compound against the tobacco budworm. This, of course, is in contrast to the usual mammalian toxicity data wherein higher $LD_{50}$ values are desirable since they are an indication of lower toxicity toward human beings.

Referring to Table II, it can be seen that inventive compound 1, when applied topically to the budworm, is about 18.5 times more effective than compound 2, its ethoxy homolog. Similar effects are noted when compound 1 is compared with related prior art compounds 3 (2 times more effective), and 4 (15.8 times more effective).

The inventive compounds are substantially more effective against tobacco budworm than compound 5 which is Zinophos® Nematocide.

COMPARATIVE EXAMPLE 3.—ACTIVITY AGAINST LYGUS AND BOLL WEEVIL (1) Tarnished plant bug—*Lygus lineolaris* (Palisot de Beauvois)

Test compounds are prepared as 10 p.p.m. solutions in 10% acetone, 0.2% Alrodyne 315, and 89.8% water. The primary leaves of Sieva lima bean plants are dipped for 3–5 seconds in the test solutions and placed in an exhaust hood to dry. When dry, each leaf is placed in a 4-inch petri dish with a moist filter paper on the bottom. Ten adult lygus bugs are aspirated from the stock culture and placed in the petri dish. The dishes are covered and held at 80° F. and 60% R.H. After 2 days, mortality counts are made.

(2) Boll weevil—*Anthonomus grandis* Boheman

Test compounds are prepared as 10 p.p.m. solutions in 10% acetone, 0.2% Alrodyne 315, and 89.8% water. The first or second true leaf of young cotton plants is dipped for 3–5 seconds in the test solution and placed in an exhaust hood to dry. When dry, each leaf is placed in a 4-inch petri dish with a moist filter paper on the bottom. Ten adult boll weevils are removed from the stock culture and placed in the petri dish. The dishes are covered and held at 80° F. and 60% R.H. After 2 days, mortality counts are made.

Results are shown in Table III below:

clearly illustrate the unique and singular activity of the inventive compounds against boll weevil. In this connection it should be noted that, as in the case of lygus, when the ethoxy groups of compound 2 are replaced by methoxy groups to produce the compounds of this invention, the percent kill of boll weevil jumps remarkably from 0 to 100%.

ACTIVITY AGAINST THE ALFALFA WEEVIL

In recent years the alfalfa weevil has become a major threat to the production of alfalfa. Previously held under control by chlorinated hydrocarbon insecticides, the alfal-

TABLE III.—ACTIVITY AGAINST LYGUS AND BOLL WEEVIL

| | Number | Compound | Mortality at 10 p.p.m., percent | |
|---|---|---|---|---|
| | | | Lygus | Boll weevil |
| This invention | 1 | $(CH_3O)_2\overset{S}{\overset{\|}{P}}-O-$ pyrazine-$CH_3$,$CH_3$ | 100 | 100 |
| Prior art compounds | 2 | $(C_2H_5O)_2\overset{S}{\overset{\|}{P}}-O-$ pyrazine-$CH_3$,$CH_3$ | 0 | 0 |
| | 3 | $(n\text{-}C_3H_7O)_2\overset{S}{\overset{\|}{P}}-O-$ pyrazine-$CH_3$,$CH_3$ | 0 | 0 |
| | 4 | $(i\text{-}C_3H_7O)_2\overset{S}{\overset{\|}{P}}-O-$ pyrazine-$CH_3$,$CH_3$ | 0 | 0 |
| | 5 | $(CH_3O)_2\overset{S}{\overset{\|}{P}}-O-$ pyrazine-$CH_3$ | 60 | 0 |
| | 6 | $(C_2H_5O)_2\overset{S}{\overset{\|}{P}}-O-$ pyrazine-$CH_3$ | 100 | 0 |
| | 7 | $(C_2H_5O)_2\overset{S}{\overset{\|}{P}}-O-$ pyrazine | 100 | 0 |

The efficacy of the inventive compounds against lygus and boll weevil is clearly exemplified by the data shown in Table III above.

Inventive compound 1 exhibits 100% kill of lygus at a dosage of 10 p.p.m. while related prior art compounds 2 (the ethoxy homolog), 3 (the n-propyl homolog), and 4 (the isopropyl homolog) are devoid of any activity whatsoever against lygus. In this connection, it should be noted that when the ethoxy groups of compound 2 are merely replaced by methoxy groups to thereby produce the compounds of this invention, the percent kill of lygus jumps remarkably from 0 to 100%.

Although less closely related prior art compounds 5, 6, and 7 are active against lygus, they are totally inactive against the boll weevil. Inventive compound 1 is, in fact, the only compound in Table III which shows any activity whatsoever against boll weevil. The data of Table III thus fa weevil has not only become resistant to these measures but adverse residues which show up in the milk of dairy animals have caused the removal of registrations of these materials for this use. Therefore, effective safe materials are needed to control this pest which do not leave harmful residues.

COMPARATIVE EXAMPLE 4.—ACTIVITY AGAINST THE ALFALFA WEEVIL

A field study was conducted to determine the effectiveness of the compounds of this invention in comparison to Zinophos® Nematocide and malathion for the control of the alfalfa weevil larvae. Each material formulated as an emulsifiable concentrate was applied to 10 x 50 foot plots of heavily infested alfalfa. The inventive compounds and Zinophos® were applied at a rate of 0.5 lb. actual insecticide per acre and compared to a standard treatment of malathion at 1.25 lbs. actual insecticide per acre. The materials were applied with a tractor mounted sprayer fitted with a 10 foot boom calibrated to deliver 20 gallons of water diluted spray per acre.

At intervals of 8, 14 and 21 days after spraying, alfalfa weevil larvae were collected from each plot by making 10 random sweeps across the tops of the plants with a sweep net. The number of larvae per 10 sweeps per plot were determined and compared to untreated plots. The percent control in the treated plots was determined using Abbott's formula as follows:

$$\frac{X-Y}{X} \times 100 = \text{percent control}$$

where:
X = number of live larvae in untreated plots.
Y = number of live larvae in treated plots.

Results are shown below in Table IV.

tion on and elution in fractions from magnesium silicate. The fraction containing the product (2.3 parts, 23 percent of theory) had $n_D^{25} = 1.5230$.

*Analysis.*—Calculated for $C_8H_{13}PN_2SO_3$ (percent): C, 38.7; H, 5.27; N, 11.29; S, 12.90; P, 12.46. Found (percent: C, 38.71; H, 5.23; N, 11.36; S, 13.04; P, 12.52.

We claim:
1. A method for controlling insects and acarides which comprises contacting said insects and acarides with an insecticidally and acaricidally effective amount of the compound of the formula:

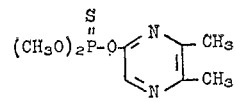

2. A method for protecting vegetation from destruction by insects and acarides which comprises applying to said

TABLE IV.—FIELD EVALUATION AGAINST ALFALFA WEEVIL LARVAE

|  | Number | Compound | Rate of application (lbs./acre) | Percent control[1] of alfalfa weevil larvae at various intervals after treatment | | |
|---|---|---|---|---|---|---|
|  |  |  |  | 8 days | 14 days | 21 days |
| This invention | 1 | $(CH_3O)_2\overset{S}{\overset{\|}{P}}-O-\text{pyrazinyl}(CH_3)_2$ | 0.5 | 99.0 | 93.8 | 63.1 |
| Prior art compound | 2 | $(C_2H_5O)_2\overset{S}{\overset{\|}{P}}-O-\text{pyrazinyl}$ Zinophos® | 0.5 | 52.1 | 72.9 | 40.7 |
|  | 3 | $(CH_3O)_2\overset{S}{\overset{\|}{P}}-S-CH\overset{O}{\overset{\|}{C}}-OC_2H_5$ $\quad\quad\quad\quad\quad \overset{\|}{CH_2}\overset{O}{\overset{\|}{C}}-OC_2H_5$ (malathion) | 1.25 | 77.0 | 73.3 | 31.3 |

[1] Corrected by Abbott's formula.

The unusual activity of the compounds of this invention against the alfalfa weevil is clearly exemplified by the data presented in Table IV above. It is apparent from these data that compound 1, at 0.5 lb. actual insecticide per acre, gives superior initial and residual control of alfalfa weevil larvae than an equal rate of Zinophos® Nematocide or 1.25 lbs. of actual malathion per acre.

EXAMPLE 5.—PREPARATION OF O,O-DIMETHYL-O-(5,6 - DIMETHYL-2-PYRAZINYL) PHOSPHOROTHIOATE

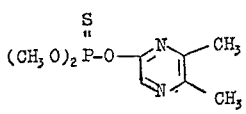

To 6 parts of sodium 5,6-dimethyl pyrazinolate in 158 parts of tert-butyl alcohol was added 6.6 parts of O,O-dimethyl phosphorochloridothioate. After stirring at ambient temperature for three hours, the tert-butyl alcohol was distilled under reduced pressure. The residual dark oil was dissolved in CCl$_4$, filtered, and purified by adsorpvegetation an insecticidally and acaricidally effective amount of the compound of claim 1.

3. A method for controlling soil borne insects which comprises applying to soil containing said insects an insecticidally effective amount of the compound of claim 1.

4. The method of claim 1 wherein said insects are selected from the group consisting of the tobacco budworm, lygus, bollworm, boll weevil and the alfalfa weevil.

5. The method of claim 2 wherein said insects are selected from the group consisting of the tobacco budworm, lygus, bollworm, boll weevil and the alfalfa weevil.

References Cited

UNITED STATES PATENTS

| 2,918,468 | 12/1959 | Dixon et al. | 260—250 |
| 3,091,614 | 9/1963 | Miller et al. | 260—250 |
| 3,340,262 | 9/1967 | Gagliardi | 260—250 |

ALBERT T. MEYERS, Primary Examiner

L. SCHENKMAN, Assistant Examiner